United States Patent
Lee et al.

(10) Patent No.: US 12,012,235 B2
(45) Date of Patent: Jun. 18, 2024

(54) SOLAR PANEL MODULE AND SPACECRAFT

(71) Applicant: CubeRocket Inc., Pohang-si (KR)

(72) Inventors: Jeongrak Lee, Daegu (KR); Eunji Lee, Daegu (KR); Youngbin Son, Pohang-si (KR); Yoonju Lee, Daegu (KR); Hanseong Jo, Goyang-si (KR)

(73) Assignee: CUBEROCKET INC., Pohang-si (KR)

( * ) Notice: Subject to any disclaimer, the term of this patent is extended or adjusted under 35 U.S.C. 154(b) by 143 days.

(21) Appl. No.: 17/572,796

(22) Filed: Jan. 11, 2022

(65) Prior Publication Data
US 2022/0297858 A1 Sep. 22, 2022

(30) Foreign Application Priority Data
Jan. 29, 2021 (KR) .................. 10-2021-0012777

(51) Int. Cl.
*B64G 1/44* (2006.01)
*H02S 30/00* (2014.01)

(52) U.S. Cl.
CPC ............. *B64G 1/443* (2013.01); *H02S 30/00* (2013.01)

(58) Field of Classification Search
None
See application file for complete search history.

(56) References Cited

U.S. PATENT DOCUMENTS

| 11,021,270 B2 * | 6/2021 | Honour | B64G 1/443 |
| 2020/0365512 A1 * | 11/2020 | Rothschild | B64G 1/10 |

FOREIGN PATENT DOCUMENTS

JP   4917801 B2 *  4/2012

OTHER PUBLICATIONS

Machine translation of JP4917801B2 (Year: 2012).*
Heon-Woo Ha et al., "On-orbit Thermal Control of MEMS Based Solid Thruster by Using Micro-igniter", J. of the Korean Society for Aeronautical and Space Sciences 42(9), 802-808(2014), DOI:http://dx.doi.org/10.5139/JKSAS.2014.42.9.802.
Bendong Liu et al., "Recent Advances in MEMS-Based Microthrusters", Micromachines, 10, 818, Nov. 26, 2019; doi:10.3390/mi10120818.

* cited by examiner

*Primary Examiner* — Ryan S Cannon
(74) *Attorney, Agent, or Firm* — LEX IP MEISTER, PLLC

(57) ABSTRACT

A solar panel module includes a solar panel; a printed circuit board combined with a plane of the solar panel and including a microchamber and an ignition circuit; and a propellant inserted into the microchamber and connected to the ignition circuit.

3 Claims, 15 Drawing Sheets

SOLAR PANEL MODULE AND SPACECRAFT

CROSS-REFERENCE TO RELATED APPLICATION

This application claims priority to and the benefit of Korean Patent Application No. 2021-0012777, filed on Jan. 29, 2021, the disclosure of which is incorporated herein by reference in its entirety.

BACKGROUND

1. Field of the Invention

The present invention relates to a solar panel module with a thrust function and a spacecraft including an outer wall on which micro-rockets are arranged.

2. Discussion of Related Art

Spacecrafts such as artificial satellites, space stations, space telescopes, and space telescopes orbiting the Earth, and space exploration satellites orbiting around other celestial bodies include a thrust device for maintaining and controlling the position on orbit, making movement during the docking process and setting the direction of the propulsion. Thrust refers to the propulsion force as a reaction force against the propellant pushing the surrounding fluid or by burning fuel.

Spacecraft use rocket engines because there is no fluid or little fluid around them. A rocket, a propulsion engine that propels forward using purely burning fuel even in the absence of air and blowing out high-pressure gas, obtains the power they need to fly by sending the combustion gases, generated by the combustion action of fuel and oxidizer, out of the engine's nozzle. When gas is sent out, the rocket gains propulsion by the amount of momentum the gas has according to the action-reaction law or the law of conservation of momentum.

The rocket propulsion engine is largely divided into a solid propulsion engine and a liquid propulsion engine according to the type of propellant. Solid-propelled rocket has a mixture of oxidizing agent and fuel as a single compound charged in solid form inside the rocket propulsion engine. Because there is a solid propellant mixed with fuel and oxidizer inside the fuel tank, when it is ignited the gas generated by combustion of this propellant is ejected through an ejector.

Liquid-propelled rocket has fuel and oxidant in tanks respectively. Kerosene is widely used as a fuel, and liquid oxygen is used as an oxidizing agent. The liquid propulsion engine injects fuel and oxidizer into the combustion chamber of the rocket just as fuel and oxygen are supplied to an automobile engine. The liquid propulsion engine causes the combustion in the combustion chamber and ejects the combustion gas through the ejector.

Recently, a micro-satellite called CubeSat or cube-satellite is being developed. Current standard for cube-satellite is within 10 cm in width, length, and height, and within IL in volume and called as a 'UNIT'. If it is configured with one unit, it is called 1U CubeSat, and if there are two units, it is called 2U CubeSat. Unlike general satellites, since CubeSat is small, durable and has simple design, the payloads inside are unbreakable and durable. Also, since there is a fixed standard, multiple units can be fired using the same projectile. This means that the cost is low and mass production is possible, and although it cannot perform various and huge missions like general satellites, it has the advantage of launching several or dozens of satellites and cover wide range all at the same time.

Since several cube-satellites fly in formation, a thrust engine for controlling attitude and keeping space is essential. However, since the thruster mounted on a spacecraft is large and heavy, it is difficult to apply it to a cube-satellite. In particular, the liquid propulsion engine is difficult to apply because a separate fuel tank is required.

SUMMARY OF THE INVENTION

The present disclosure is directed to providing a solar panel module in which micro rockets are arranged to generate micro thrust.

The present disclosure is directed to providing spacecraft with micro-rockets arranged on the outer wall to control the position through micro-thrust.

Additional aspects of the disclosure will be set forth in part in the description which follows and, in part, will be obvious from the description, or may be learned by practice of the disclosure.

In accordance with an embodiment of the present disclosure, a solar panel module includes a solar panel; a printed circuit board being combined with a plane of the solar panel and including a microchamber and an ignition circuit; and a propellant inserted into the microchamber and connected to the ignition circuit.

The solar panel module may further include a reinforcing layer disposed between the solar panel and the printed circuit board.

The solar panel module may further include an adhesive layer for reinforcing layer disposed between the printed circuit board and the reinforcing layer to combine the printed circuit board with the reinforcing layer.

In accordance with an embodiment of the present disclosure, a spacecraft includes a frame accommodating payloads inside; a printed circuit board combined with the outside of the frame and including a microchamber and an ignition circuit; and a propellant inserted into the microchamber and connected to the ignition circuit.

The printed circuit board may form the outer wall of the frame and may include transparent materials.

The spacecraft may further include a reinforcing layer combined with the bottom surface of the printed circuit board.

The spacecraft according may further include a solar panel combined with the bottom surface of the solar panel.

The printed circuit board may include a plurality of microchambers. The ignition circuit may be configured to separately control each of the plurality of microchambers.

In accordance with an embodiment of the present disclosure, a method for manufacturing a solar panel module includes combining a reinforcing layer with the plane of the solar panel; inserting a propellant into the microchamber of the printed circuit board; combining the printed circuit board with the plane of the reinforcing layer; combining the ignition element with the printed circuit board; and combining the nozzle layer with the plane of the printed circuit board.

Combining a reinforcing layer with the plane of the solar panel may include applying an adhesive to the bottom surface of the reinforcing layer; and curing the adhesive after disposing the reinforcing layer on the plane of the solar panel.

A solar panel module according to an embodiment of the present invention may provide a function to provide thrust and generate power at the same time by arranging a micro rocket on a solar panel.

The spacecraft according to an embodiment of the present invention may generate thrust for controlling position without consuming a separate space and mass budget by packaging the thrust panel on various parts the spacecraft, such as solar panels.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
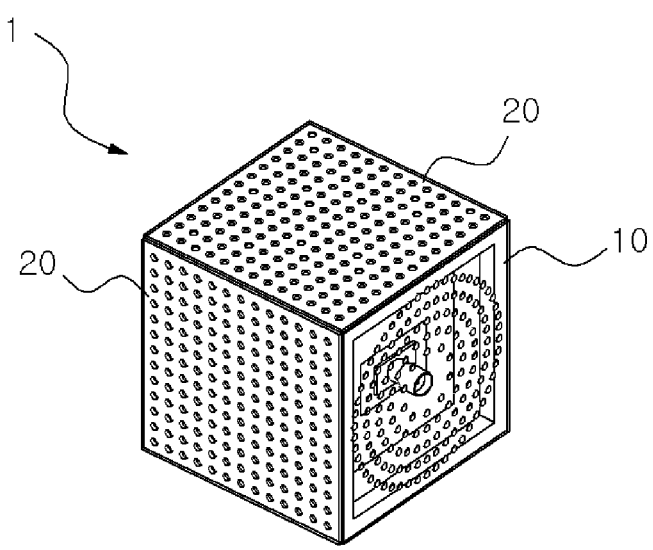
FIG. 1 is a perspective view of spacecraft according to an exemplary embodiment of the present invention.

Reference will now be made in detail to the embodiments of the present disclosure, examples of which are illustrated in the accompanying drawings, wherein like reference numerals refer to like elements throughout. The present disclosure may, however, be embodied in many different forms and should not be construed as being limited to the embodiments set forth herein. The shapes and sizes of elements in the drawings may be exaggerated for a clear description.

The terms used in the present specification are merely used to describe particular embodiments, and not intended to limit the present disclosure. An expression used in the singular encompasses the expression of the plural, unless the context clearly indicates otherwise. Throughout the specification, it is to be understood that the terms such as "include" or "have etc., are intended to indicate the existence of the features, numbers, operations, components, parts, or combinations thereof disclosed in the specification, are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms. The above terms are used only to distinguish one component from another. For example, a first component discussed below could be termed a second component, and similarly, the second component may be termed the first component without departing from the teachings of this disclosure. As used herein, the term "and/or" includes any and all combinations of one or more of the associated listed items.

Hereinafter, exemplary embodiments of the present invention will be described below with reference to the drawings.

Figure 2:
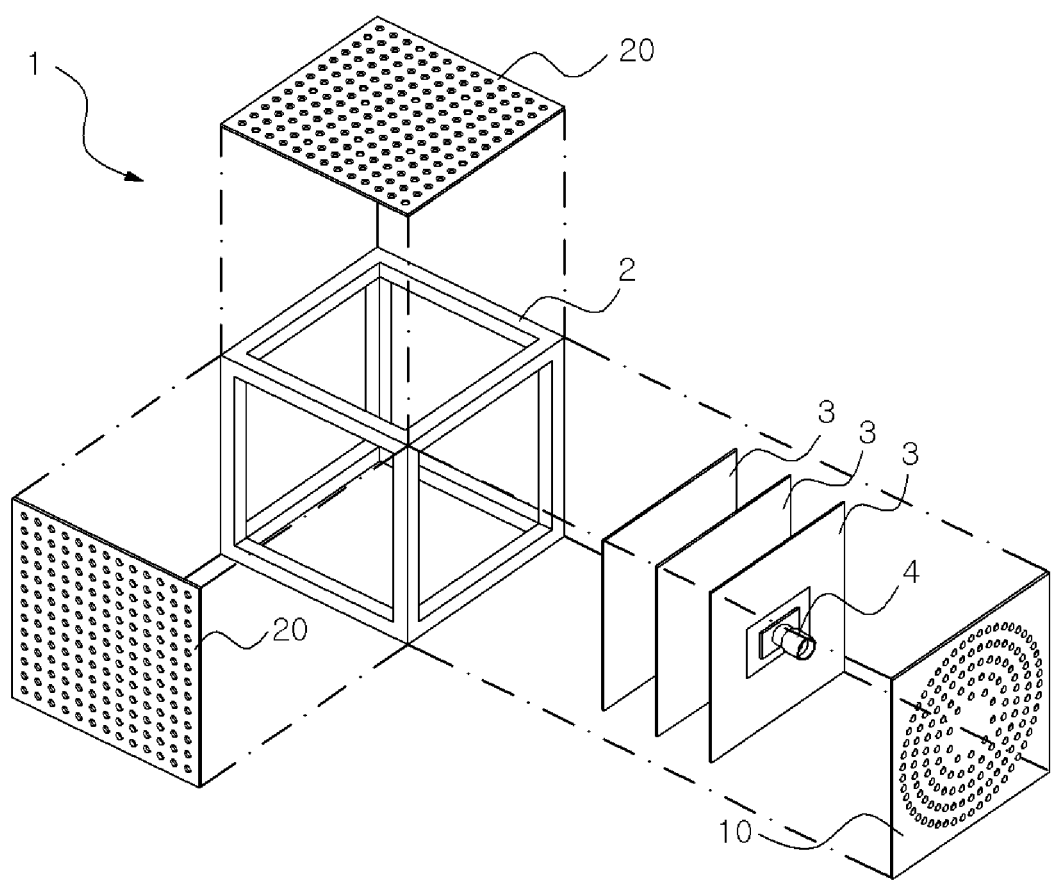
FIG. 2 is an exploded perspective view of the spacecraft in FIG. 1.

FIG. 1 is a perspective view showing a spacecraft according to an embodiment of the present invention and FIG. 2 is an exploded perspective view of the spacecraft in FIG. 1.

Referring to FIG. 1 and FIG. 2, the spacecraft 1 according to the embodiment of the present invention may be a cube-satellite including a small thruster. The spacecraft 1 may include a frame 2 and a payload 3 accommodated inside the frame 2. Depending on the purpose of the spacecraft 1, the payload 3 may include observation equipment, measurement equipment, communication equipment etc. In particular, the payload 3 may include a camera 4, a sensor, a radar, a communication repeater, an antenna, etc.

The spacecraft 1 may include a solar panel module 20 forming an outer wall of the frame 2 or a thrust panel 10 forming an outer wall of the frame 2. The spacecraft 1 may require a solar cell and a battery to supply power to the payload 3. In addition, the spacecraft 1 may require an attitude control device that directs the attitude and the orbit to the desired direction and stabilizes the attitude by maintaining the position.

The solar panel module 20 according to the embodiment of the present invention may perform both a power supply function and an attitude control function. The thrust panel 10 according to an embodiment of the present invention may perform an attitude control function while forming the outer wall of the frame 2.

Figure 3:
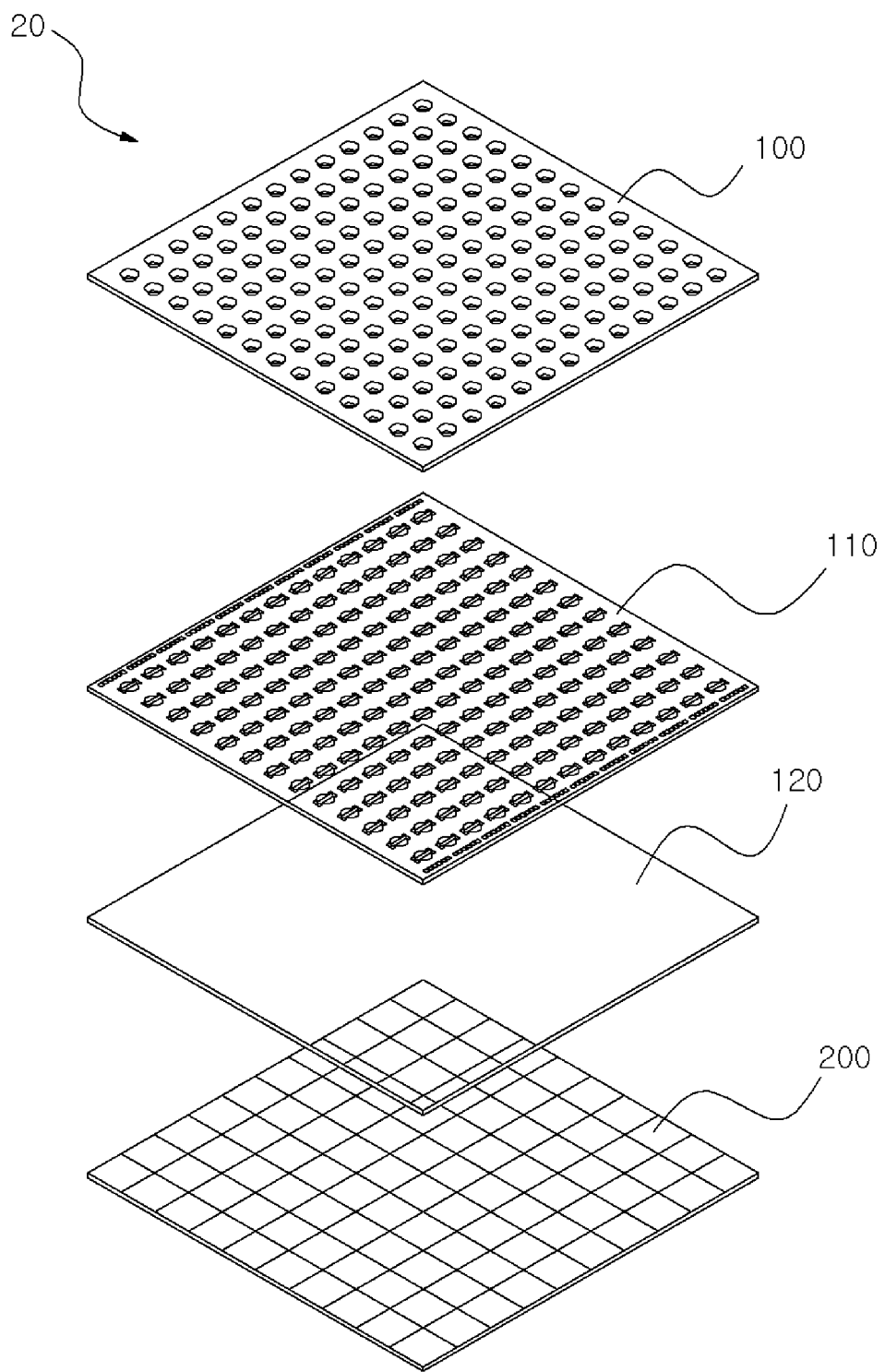
FIG. 3 is an exploded perspective view of the solar panel module in FIG. 2.
Figure 4:
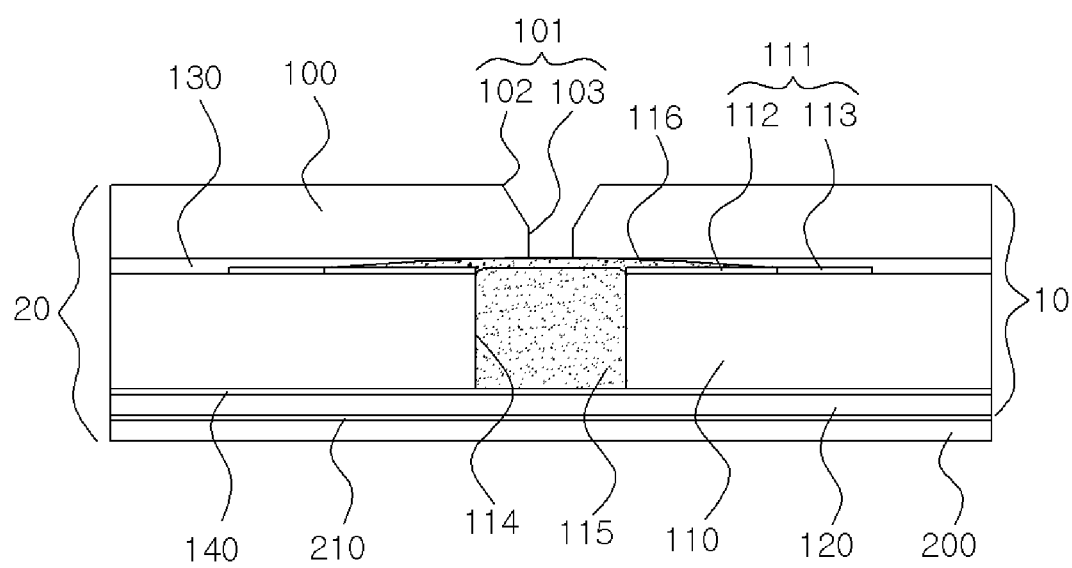
FIG. 4 is a cross-sectional view of a portion of the solar panel module in FIG. 2.
Figure 5:
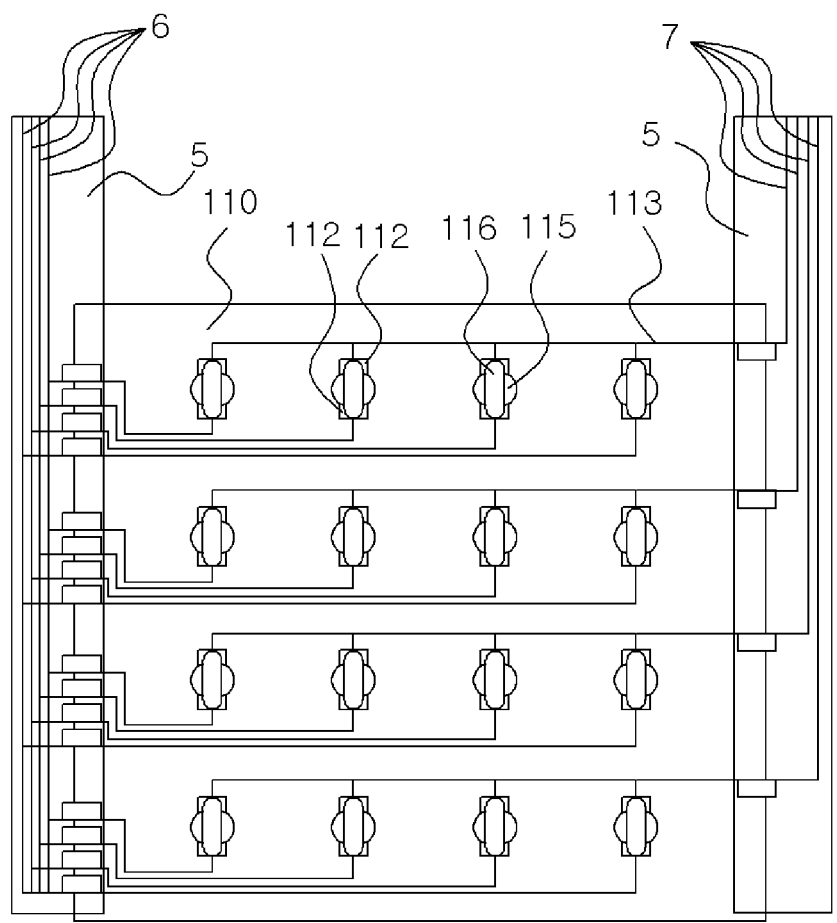
FIG. 5 is a view showing an ignition circuit of the printed circuit board in FIG. 4.

FIG. 3 is an exploded perspective view of the solar panel module in FIG. 2 and FIG. 4 is a cross-sectional view of a portion of the solar panel module in FIG. 2, and FIG. 5 is a view showing an ignition circuit of the printed circuit board in FIG. 4.

Referring to FIGS. 3 through 5, the solar panel module 20 according to the embodiment of the present invention may include a solar panel 200 and the thrust panel 10. The thrust panel 10 according to the embodiment of the present invention may include a printed circuit board 110 and a nozzle layer 100. The printed circuit board 110 may be combined on the plane of the solar panel 200.

The printed circuit board 110 may include microchamber 114 and ignition circuit 111 wherein ignition circuit connects the microchambers 114. A propellant 115 for rocket propulsion may be inserted into the microchamber 114. The propellant 115 may be a solid propellant. The propellant 115 may be mixed in a gel form and combined with the printed circuit board 110 by injecting into the microchamber 114 and cured.

The printed circuit board 110 may be formed of various materials such as epoxy, silicon, glass, and ceramic. The printed circuit board 110 may be formed of transparent materials. The microchamber 114 may be formed by a routing process included in the manufacturing process of the printed circuit board 110. The microchamber 114 may be formed on the printed circuit board 110 by using a method such as drilling or etching. The microchamber 114 may be formed to penetrate the printed circuit board 110.

The printed circuit board 110 may include a plurality of microchambers 110. The plurality of microchambers 114 may be arranged in a grid shape to be evenly distributed on the printed circuit board 110. The plurality of microchambers 114 may be arranged in a rectangular, circular, or radial shape to ensure transparency of a portion of the printed circuit board 110 as necessary. In addition, the plurality of microchambers 114 may be arranged in various ways or arranged in any shape to facilitate attitude control. The plurality of microchambers 114 may be disposed to achieve optimum control efficiency according to the shape, size, and mission of the spacecraft. The plurality of microchambers 114 may be disposed to maximize the function or efficiency of the payload 3 or the solar panel 200 disposed inside the thrust panel 10.

An ignition element 116 may be combined with the printed circuit board 110 for ignition of the propellant 115. The ignition element 116 may be combined with the ignition circuit 111 to form the ignition circuit 111. The ignition element 116 may be combined to the electrodes 112 of the ignition circuit 111 to connect to each other. The ignition element 116 may be arranged to cover at least a portion of a propellant 115. The propellant 115 may be connected to the ignition circuit 111 by the ignition element 116. The ignition element 116 may be integrated with propellant 115 as it is spreaded on the propellant 115 in a gel or semi-solid form and solidifed.

When the plurality of microchambers 114 are formed on the printed circuit board 110, the ignition circuit 111 may be configured to separately control each of the plurality of microchambers 114. In the thrust panel 10 according to an embodiment of the present invention, a rocket composed of a microchamber 114, a propellant 115, an ignition element 116, etc. can be disposed in a large amount to be individually ignited when needed, so it can be used for controlling the attitude and trajectory during the life of the aircraft 1.

The ignition circuit 111 may include an electrode 112 spaced apart by the diameter of the microchamber 114 and a conductive wire 113 connected to the electrode 112. When the microchambers 114 are arranged in a lattice form, the conductive wires 113 may be disposed to connect each row and each column. One of the pair of conductive wires connected to each microchamber 114 may operate as a source, and the other may operate as a sink. One of the pair of conductors connected to each microchamber 114 is connected to a source wiring 6 of a control signal wiring board 5, and the other is connected to a sink wiring 7 of the control signal wiring board 5. Power supply to each row and each column of the arrangement of the plurality of microchambers 114 may be controlled.

The nozzle layer 100 may be combined with the plane of the printed circuit board 110. The nozzle layer 100 may include a nozzle 101 disposed to correspond to the position of the microchamber 114 formed on the printed circuit board 110. The nozzle 101 may be formed so that the angle of the inclined surface connecting a nozzle neck 103 with the narrowest width and a nozzle outlet 102 with the widest width is 12 to 18 degrees.

The thrust panel 10 may include an adhesive layer for nozzle layer 130 for combining the printed circuit board 110 and the nozzle layer 100. The adhesive layer for nozzle layer 130 may be disposed between the printed circuit board 110 and the nozzle layer 100. An ignition element 116 combined with the plane of the printed circuit board 110 may be disposed within the adhesive layer for nozzle layer 130. The nozzle layer 100 may be formed of various transparent materials such as epoxy, glass, etc.

The thrust panel 10 or the solar panel module 20 according to an embodiment of the present invention may include a reinforcing layer 120 and an adhesive layer for reinforcing layer 140. The reinforcing layer 120 may be combined with the bottom surface of the printed circuit board 110. The reinforcing layer 120 may be disposed between the printed circuit board 110 and a solar panel 200. The adhesive layer for reinforcing layer 140 may be disposed between the printed circuit board 110 and the reinforcing layer 120 to combine printed circuit board 110 with the reinforcing layer 120. The solar panel module 20 may include a solar panel adhesive layer 210 disposed between the reinforcing layer 120 and the solar panel 200. The solar panel adhesive layer 210 may be disposed between the solar panel 200 and the reinforcing layer 120. The reinforcing layer may be formed of various transparent materials such as epoxy, glass, etc.

The thrust panel 10 or the solar panel module 20 may be combined with the outside of the frame 2 of the spacecraft 1 to form an outer wall. The printed circuit board 110 may be combined with the outside of the frame 2 of the spacecraft 1 to form an outer wall of the frame 2. Since the thrust panel 10 is all formed of a transparent material, even if it is packaged on the payload 3 such as the camera 4 and communication equipment accommodated in the frame 2, the function or performance of the payload 3 may not be affected. Since the thrust panel 10 is all formed of a transparent material, when combined with the solar panel 200 to form the solar panel module 20, the power generation function or performance of the solar panel 200 may not be affected.

Figure 6:
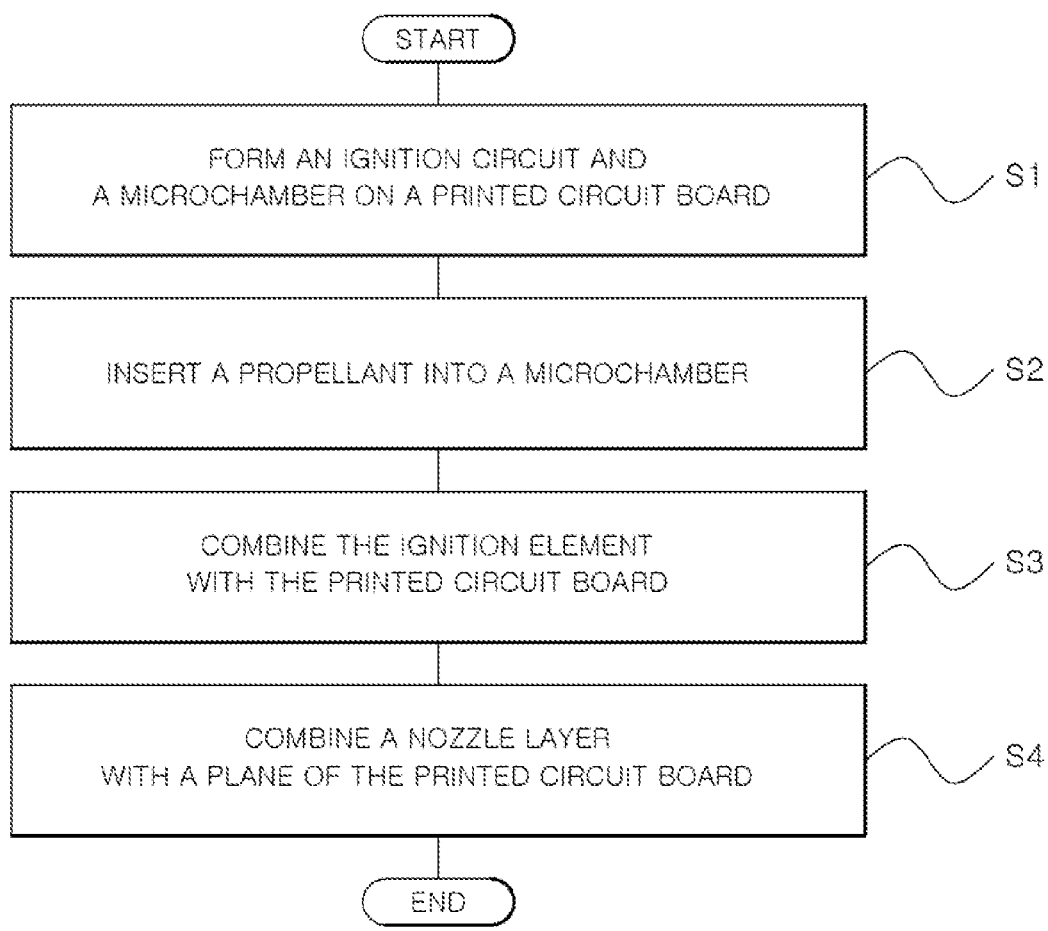
FIG. 6 is a flowchart showing a method of manufacturing a thrust panel according to an exemplary embodiment of the present invention.
Figure 7:
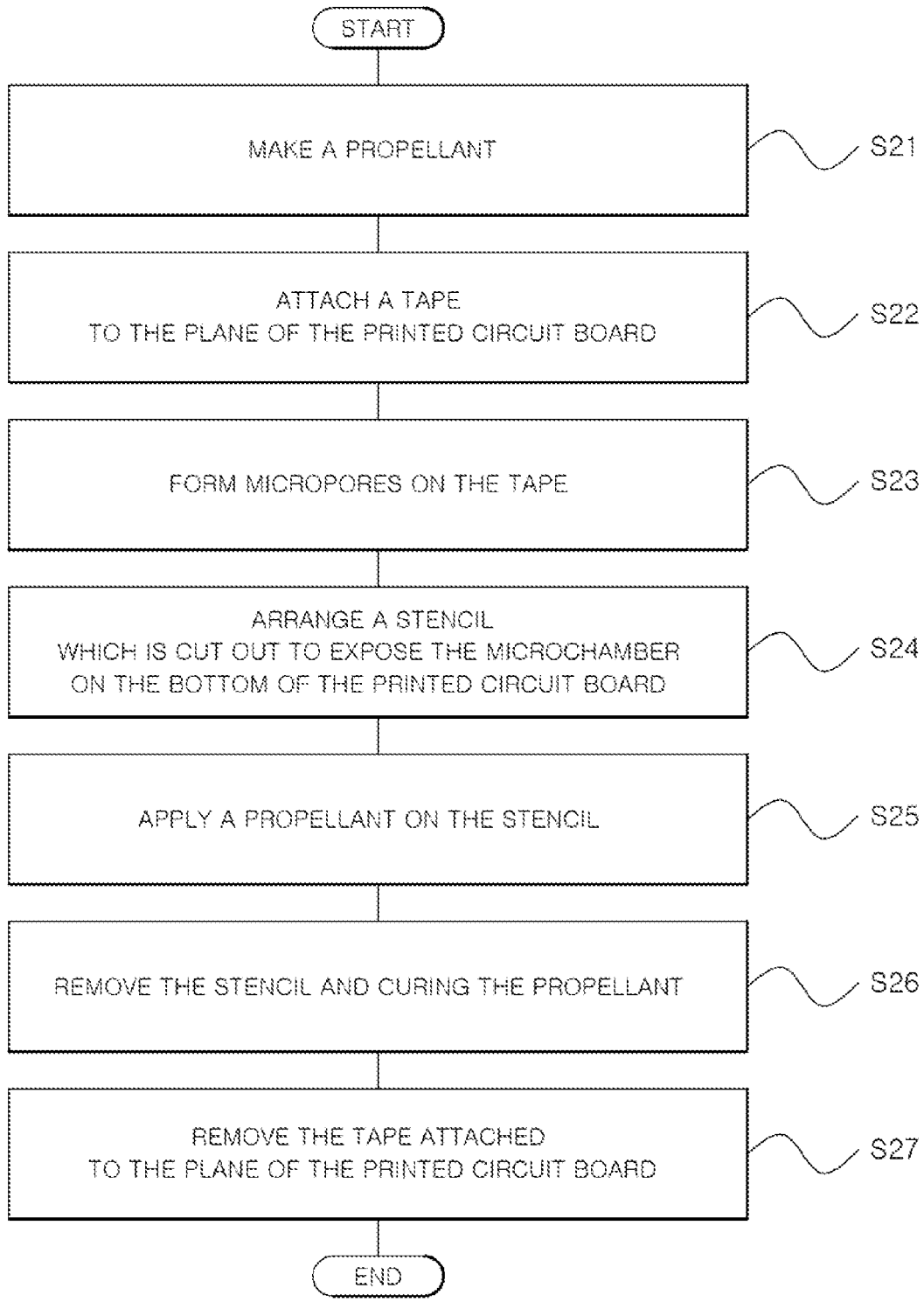
FIG. 7 is a flowchart of inserting the propellant into the microchamber in FIG. 6.
Figure 8:
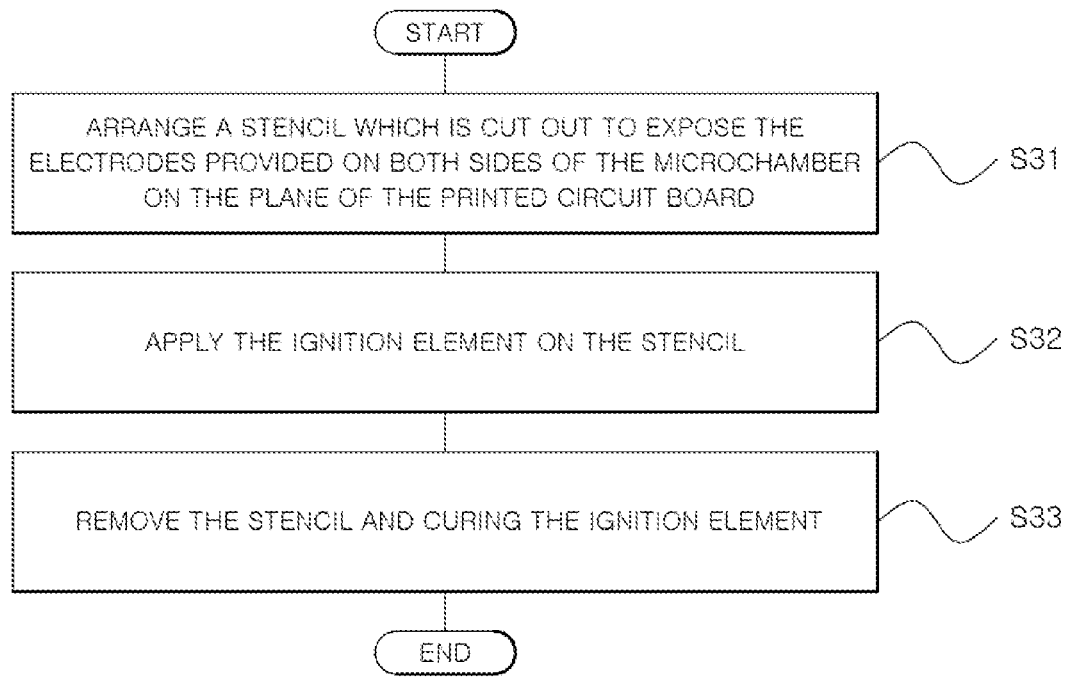
FIG. 8 is a flowchart of coupling the ignition element to the printed circuit board in FIG. 6.
Figure 9:
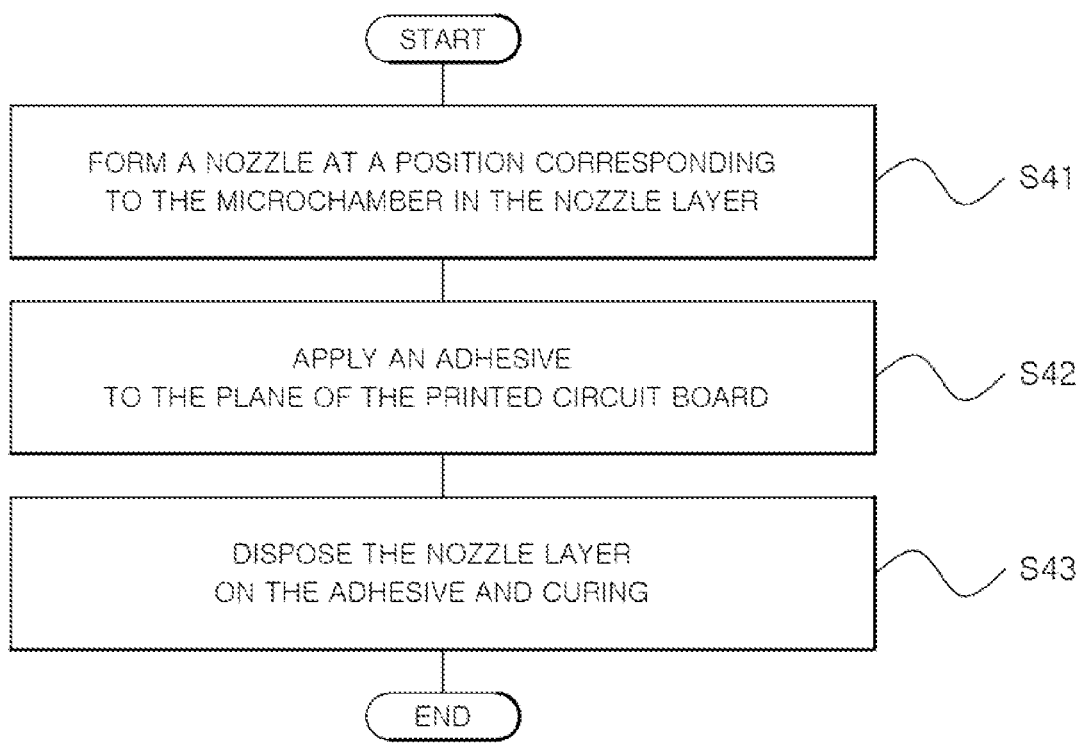
FIG. 9 is a flowchart of combining the nozzle layer with the plane of the printed circuit board in FIG. 6.

FIG. 6 is a flowchart showing a method of manufacturing a thrust panel according to an embodiment of the present invention and FIG. 7 is a flowchart of inserting the propellant into the microchamber in FIG. 6. FIG. 8 is a flowchart of the step of coupling the ignition element to the printed circuit board in FIG. 6, and FIG. 9 is a flowchart of coupling the nozzle layer with the plane of the printed circuit board in FIG. 6.

Figure 10:
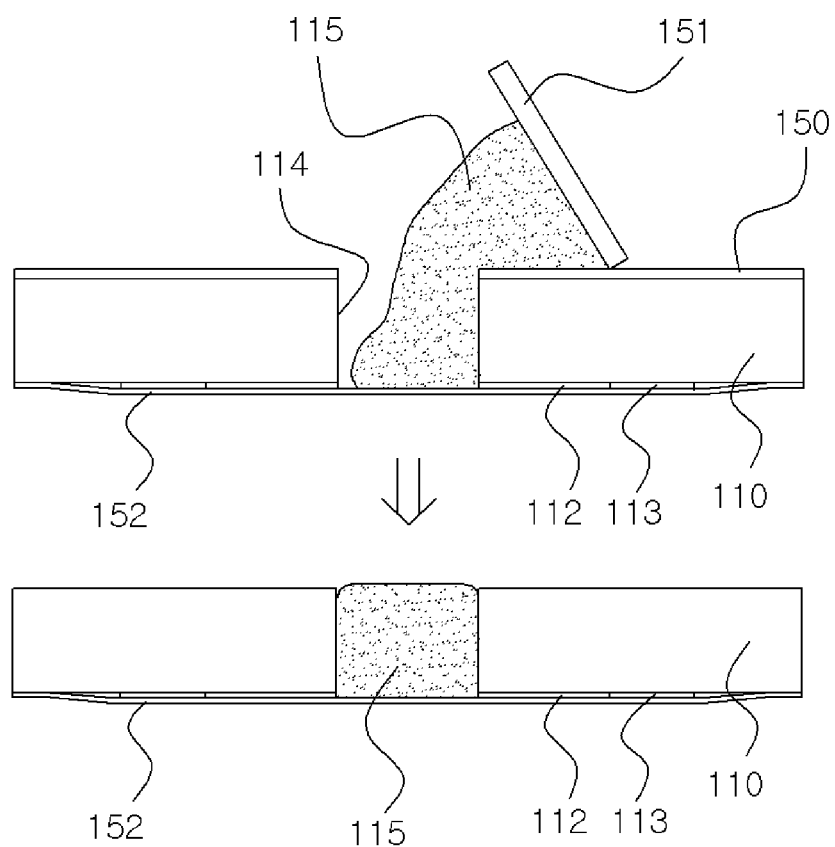
FIG. 10 is a view on inserting the propellant into the microchamber in FIG. 6.
Figure 11:
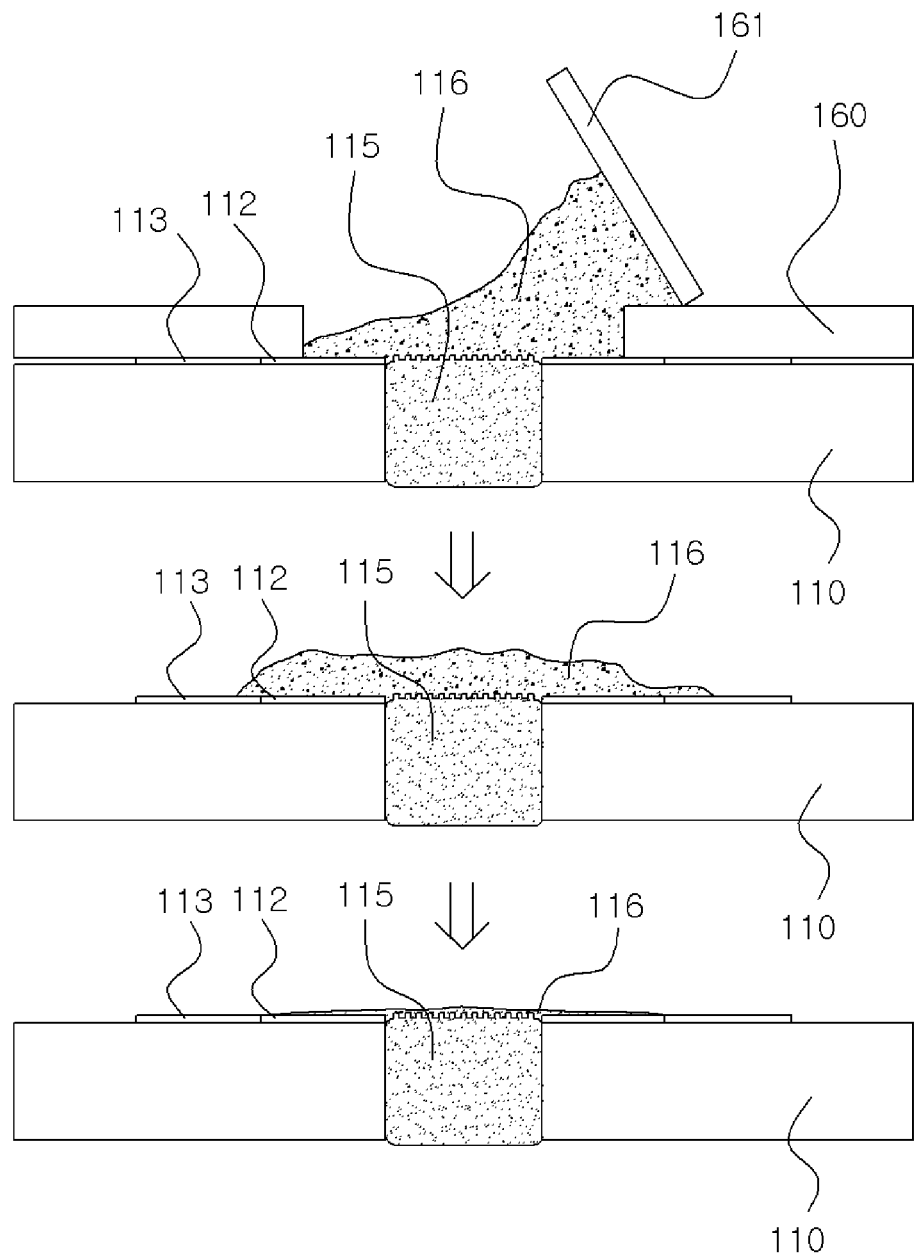
FIG. 11 is a view on coupling the ignition element to the printed circuit board in FIG. 7.
Figure 12:
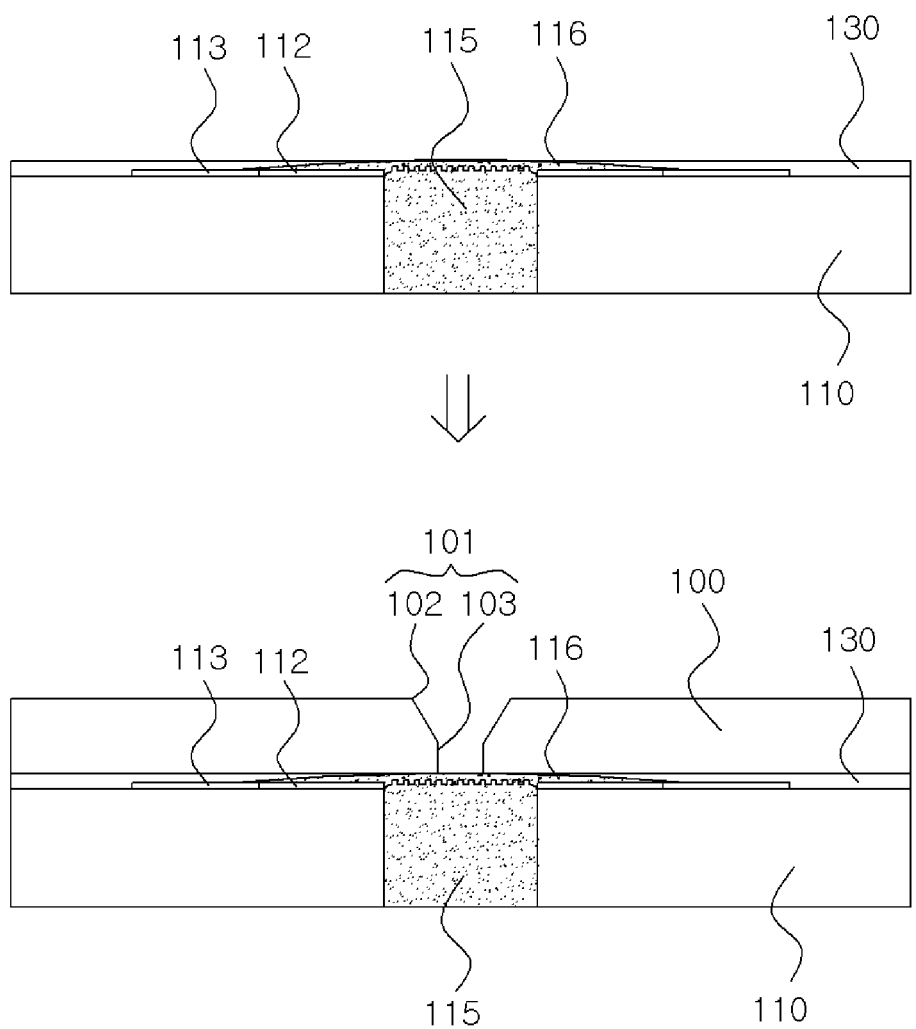
FIG. 12 is a view on combining the nozzle layer with the plane of the printed circuit board in FIG. 8.

FIG. 10 is a view on inserting the propellant into the microchamber in FIG. 6 and FIG. 11 is a view on coupling the ignition element to the printed circuit board in FIG. 7 and FIG. 12 is a view on combing the nozzle layer with the plane of the printed circuit board in FIG. 8.

A method for manufacturing a thrust panel according to an embodiment of the present invention may include forming an ignition circuit 111 and a microchamber 114 on a printed circuit board 110 (S1), inserting a propellant 115 into a microchamber 114 (S2), combining the ignition element 116 with the printed circuit board 110 (S3), and combining a nozzle layer 100 with a plane of the printed circuit board 110 (S4).

Forming an ignition circuit 111 and a microchamber 114 on the printed circuit board 110 (S1) may include manufacturing a printed circuit board, forming a microchamber, and forming an ignition circuit. In manufacturing the printed circuit board, the printed circuit board 110 may be made of various materials such as epoxy, silicon, glass, and ceramic. The printed circuit board 110 may be made of transparent materials.

In manufacturing microchamber, the microchamber 114 may be formed by a routing process included in the manufacturing process of the printed circuit board 110. The microchamber 114 may be formed on the printed circuit board 110 by using a method such as drilling, etching, etc. The microchamber 114 may be formed to penetrate the printed circuit board 110.

In forming the ignition circuit, electrodes 112 are disposed at both ends of the microchamber 114 through the MEMS process, and a conductive wire 113 may be printed so that each of the plurality of microchambers 114 can be controlled.

Inserting a propellant 115 into a microchamber 114 (S2) may include making a propellant (S21), attaching a tape to the plane of the printed circuit board (S22); forming micropores on the tape 152 (S23); arranging a stencil, which is cut out to expose the microchamber on the bottom of the printed circuit board (S24); applying a propellant on the stencil (S25); removing the stencil and curing the propellant (S26); and removing the tape attached to the plane of the printed circuit board (S27).

The propellant 115 used in the thrust panel 10, the solar panel module 20, and the spacecraft 1, according to an embodiment of the present invention, is based on a solid propellant. A solid propellant refers to a propellant in which both states of an oxidizing agent and a fuel are solid. Since the propellant 115 is inserted into each microchamber 114 by the stencil technique, it may have a viscosity appropriate for the stencil technique before curing.

In general, as the oxidizing agent ammonium perchlorate, ammonium nitrate, potassium nitrate, etc. may be used and as the fuel uses a polymer-based binder such as HTPB, HDPE, sorbitol, aluminum powder, boron powder, and metal powder may be used. In the case of the propellant 115 according to an embodiment of the present invention, ammonium perchlorate may be used as an oxidizing agent for simplification of the process, and a polymer called PDMS may be used as the fuel. Each mixing ratio may be 60 to 90 wt % of ammonium perchlorate and 10 to 40 wt % of PDMS. In order to have high Isp (specific impulse), propellant may include 17 wt % of PDMS and 83 wt % of ammonium perchlorates.

In making a propellant (S21), put the PDMS resin and the curing agent in a ratio of 10:1 (mass ratio), and mix by 1 set using a paste mixer; wherein 1 set is 30 seconds at 2000 rpm and 30 seconds at 2200 rpm. When the mixed PDMS solution is 17 wt %, 83 wt % of the oxidizer powder is poured onto the PDMS. The propellant mixture is again mixed with a paste mixer by 3 sets or more to make it homogeneously mixed.

In attaching a tape to the plane of the printed circuit board (S22), a high heat-resistant tape 152 is applied to the entire plane of the printed circuit board 110 to prevent the propellant from leaking to the opposite side when filling the propellant through the stencil technique.

In forming micropores on the tape 152 (S23), a micropore may be formed in the region corresponding to the microchamber 114 of the tape 152 so that the air bubbles can escape when the propellant 115 is filled in the microchamber 114.

In arranging a stencil, which is cut out to expose the microchamber, on the bottom surface of the printed circuit board (S24), the printed circuit board 110 is turned over and a stencil 150 for inserting the propellant 115 into the bottom surface of the printed circuit board 110 can be placed.

In applying the propellant on the stencil (S25), pre-cured propellant 115 is pushed on the stencil of 0.1 mm thickness by a scraper 151 for inserting fuel and a pre-cured propellant 115 may be filled in the microchamber.

In removing the stencil and curing the propellant (S26), the propellant may be cured by a convection oven. If the printed circuit board 110 filled with the propellant 115 is heated for about 30 minutes in the oven at 150 degrees Celsius, the propellant may be completely cured.

As the amount of the curing agent increases in the ratio of the resin and the curing agent, the Young's Modulus of the PDMS binder increases and it becomes harder. The mixing ratio may be adjusted to form desired physical properties. The mixing time can also be adjusted at various rpm for various times, until the paste is properly mixed.

When the propellant 115 is completely cured, inserting a propellant into a microchamber (S2) may be completed by removing the tape 152 attached to the plane of the printed circuit board (S27).

Combining the ignition element 116 with the printed circuit board 110 (S3) may include arranging a stencil, which is cut out to expose the electrodes provided on both sides of the microchamber are exposed on the plane of the printed circuit board (S31), applying the ignition element on the stencil (S32), and removing the stencil and curing the ignition element (S33).

The ignition element 116 may be a paste containing a conductive material such as carbon nanotubes (CNT), carbon powder, etc. Although the ignition element 116 has conductivity, it has a resistance that is several thousand to tens of thousands of times higher than that of a metal. Thus, when an appropriate voltage is applied, the ignition element 116 may increase in temperature to around 300 degrees Celsius, the ignition point of the propellant 115, while the electrode 112 of the printed circuit board 110 maintains room temperature.

In the case of the conventional method, a thin plate of glass with an ignition circuit is placed on the propellant and physically bonded to it. The ignition system according to an embodiment of the present invention is manufactured in a manner of spreading the ignition element 116 to the propellant 115 so that the propellant 115 and the ignition element 116 may be substantially integrated. This may help further increase the ignition probability.

In addition, in the case of the existing MEMS thruster, the process was complicated because the thin plate with ignition circuit had to be manufactured through a separate process, whereas the manufacturing process of the thrust panel 10 according to an embodiment of the present disclosure may be simplified.

The method of applying the paste in a homogeneous thickness is to cover a stencil mask on the propellant and push the paste 2-3 times with scraper on the stencil mask which is similar to the process of putting the propellant in the microchamber.

In arranging a stencil, which is cut out to expose the electrodes provided on both sides of the microchamber on the plane of the printed circuit board (S31), the stencil 160 for combining the ignition element may be disposed on the plane of the printed circuit board 110 in which the propellant 115 is inserted.

In applying the ignition element on the stencil (S32), pre-cured ignition element 116 may be spreaded on the stencil by using scraper 161 for inserting ignition element into the cutout. Other than the carbon paste, any conductive paste including ceramic, Ag powder, etc. may be used as an ignition element 116. However, since the temperature must be increased to the extent that the fuel is ignited, a paste having a usable temperature of more than 300 degrees Celsius may be used.

Since the ignition element 116 becomes very thin after curing, the stencil 160 may be sufficiently thick. The change in thickness before and after curing is often not shown in the datasheet, so the change may need to be measured experimentally. The thickness of the stencil 160 may be set to 0.1 to 0.5 mm depending on the type of the ignition element 116 to be used.

In removing the stencil and curing the ignition element (S33), in the case of the ignition element 116 of the thrust panel 10 according to an embodiment of the present invention, it may be cured through leaving at room temperature for 2 hours and at 200 degrees Celcius for 2 hours by a convection oven. Other types of ignition elements 116 may be cured according to the curing temperature and conditions described in the datasheet. The ignition element 116 is preferably a paste having a curing temperature of less than 300 degrees Celsius so that ignition of the propellant 115 does not occur during curing.

Combining a nozzle layer 100 with a plane of the printed circuit board 110 (S4) may include forming a nozzle at a position corresponding to the microchamber in the nozzle layer (S41), applying an adhesive to the plane of the printed circuit board (S42), and disposing the nozzle layer on the adhesive and curing (S43).

In forming a nozzle at a position corresponding to the microchamber in the nozzle layer (S41), it is possible to make a nozzle 101 in various ways depending on the scale. The nozzle 101 may be formed so that the angle of the inclined surface connecting a nozzle neck 103 with the narrowest width and a nozzle outlet 102 with the widest width is 12 to 18 degrees. When drilling is used, machining up to a diameter of 100 pin is possible, and a tapered structure with an angle between 12 and 18 degrees may also be machined. Nozzles with a diameter of less than 100 μm can be processed through photolithography. When forming a nozzle by photoetching, the lower surface of the nozzle layer is covered with high heat resistant Kapton tape, etc., and then photoresist is applied only on the top surface to expose to a light, so that it can be processed into a tapered shape.

In applying an adhesive to the plane of the printed circuit board (S42), the UV light adhesive is poured on the plane of the printed circuit board 110 and then rotated by a spin coater to thinly coat the entire upper plane of the printed circuit board with the adhesive to form an adhesive layer for nozzle layer 130. The adhesive layer for nozzle layer 130 may be formed to a thickness that covers both the ignition circuit 111 and the ignition element 116 formed on the plane of the printed circuit board 110.

In disposing the nozzle layer on the adhesive and curing (S43), the nozzle layer 100 may be disposed on the printed circuit board 110 on which the adhesive layer for nozzle layer 130 is formed and fixed by irradiating UV light.

Figure 13:
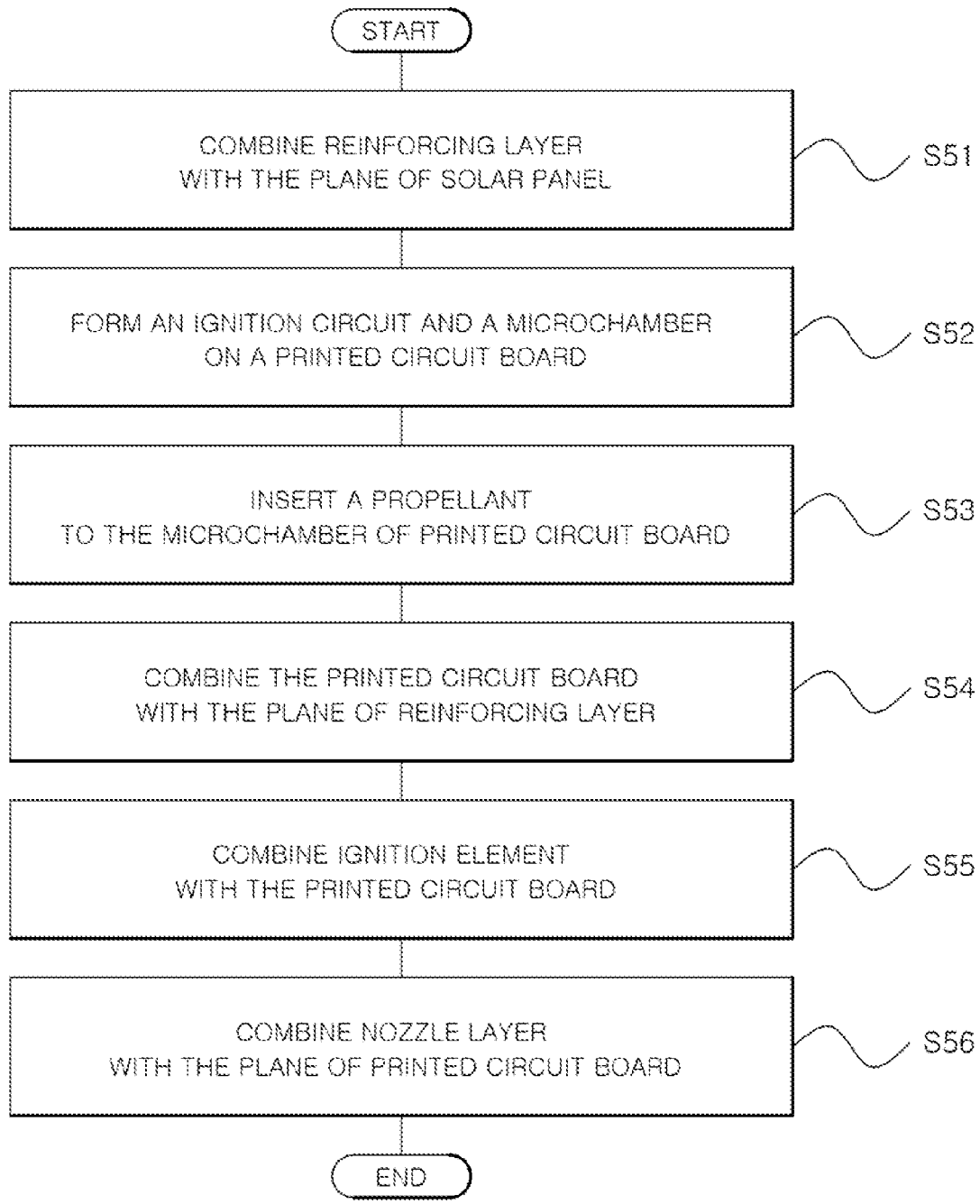
FIG. 13 is a flowchart showing a method for manufacturing a solar panel module according to an embodiment of the present invention.

FIG. 13 is a flowchart showing a method for manufacturing a solar panel module according to an embodiment of the present invention.

A method of manufacturing a solar panel module according to an embodiment of the present invention includes combining a reinforcing layer with the plane of the solar panel (S51), forming an ignition circuit and a microchamber on a printed circuit board (S52), inserting a propellant into the microchamber of the printed circuit board (S53), combining the printed circuit board with the plane of the reinforcing layer (S54), combining the ignition element with the printed circuit board (S55), and combining the nozzle layer with the plane of the printed circuit board (S56).

Combining a reinforcing layer to the plane of the solar panel (S51) may include applying an adhesive to the bottom surface of the reinforcing layer and curing the adhesive after disposing the reinforcing layer on the plane of the solar panel.

In applying the adhesive to the bottom surface of the reinforcing layer, the reinforcing layer 120 is turned over and an UV light adhesive is poured, and then the adhesive is thinly applied using a spin coater to form the solar panel adhesive layer 210. In curing the adhesive after disposing the reinforcing layer on the plane of the solar panel, the solar panel 200 may be attached to the bottom side of the reinforcing layer 120 and then bonded by irradiating UV light.

Forming an ignition circuit and a microchamber on a printed circuit board (S52) and inserting a propellant into a microchamber of the printed circuit board (S53) may be substituted by the explanation of forming an ignition circuit 111 and a microchamber 114 on a printed circuit board 110 (S1) and inserting a propellant 115 into a microchamber 114 (S2) of the thrust panel manufacturing method.

In combining the printed circuit board with the plane of the reinforcing layer (S54), a UV light adhesive is poured on the reinforcing layer 120 and then applied thinly using a spin coater to form the adhesive layer for reinforcing layer 140, and then the upper part of the reinforcing layer 120, and the lower part of the printed circuit board 110 may be in contact with each other to be bonded by irradiating UV light.

Combining the ignition element with the printed circuit board (S55) and combining the nozzle layer with the plane of the printed circuit board (S56) may be substituted by the description of combining the ignition element 116 with the printed circuit board 110 (S3) and combining a nozzle layer 100 with a plane of the printed circuit board 110 (S4) of the thrust panel manufacturing method.

The thrust panel 10 may be combined with the solar panel 200 to form the solar panel module 20, and in addition to the solar panel, the thrust panel may package various essential parts of the cube-satellite. The size of the microchamber 114 of the thrust panel 10 may be adjusted in various ways to generate a desired amount of thrust and impact.

Figure 14:
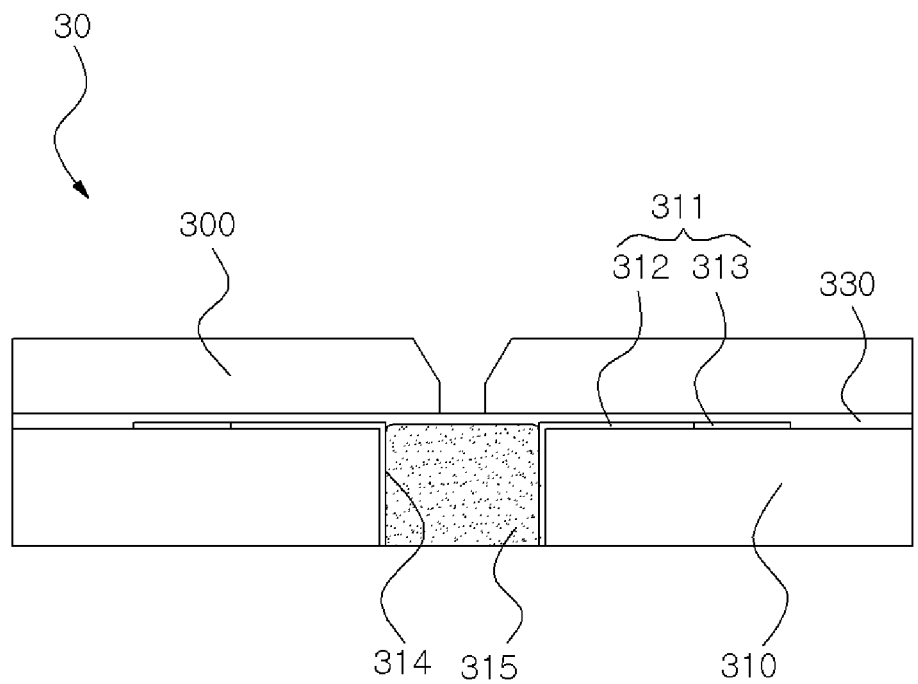
FIG. 14 is a cross-sectional view of a portion of a thrust panel according to another embodiment of the present invention.

FIG. 14 is a cross-sectional view of a portion of a thrust panel according to another embodiment of the present invention.

Referring to FIG. 14, the thrust panel 30, the solar panel module or the spacecraft according to another embodiment of the present invention may include a propellant 315 that does not require an ignition element. The propellant 315, that does not require an ignition element, may help to simply manufacture the thrust panel 10 because the propellant itself is made to a conductor and may increase the ignition probability.

The thrust panel 30 may include a printed circuit board 310, a nozzle layer 300, and adhesive layer for nozzle layer 330. The printed circuit board 310 may include microchamber 314 and an ignition circuit 311 connecting the microchamber 314. The ignition circuit 311 may include an electrode 312 and a conductive wire 313. A propellant 315 for rocket propulsion is inserted into the microchamber 314, and the propellant 315 may be connected to the ignition circuit 311. The nozzle layer 300 may be combined with the plane of the printed circuit board 310.

The propellant 315 may include a small amount of nano metal powder or a conductive material. These propellants have weak conductivity and may be manufactured so that combustion may occur completely inside the microchamber within a short time.

The electrode 312 of the ignition circuit 311 may be disposed on a side surface of the microchamber 314. When a voltage is applied to the propellant 315 by flowing a current through the ignition circuit 311, the temperature of the entire propellant may be raised above the ignition point within a short time, and combustion may occur in the entire propellant.

Figure 15:
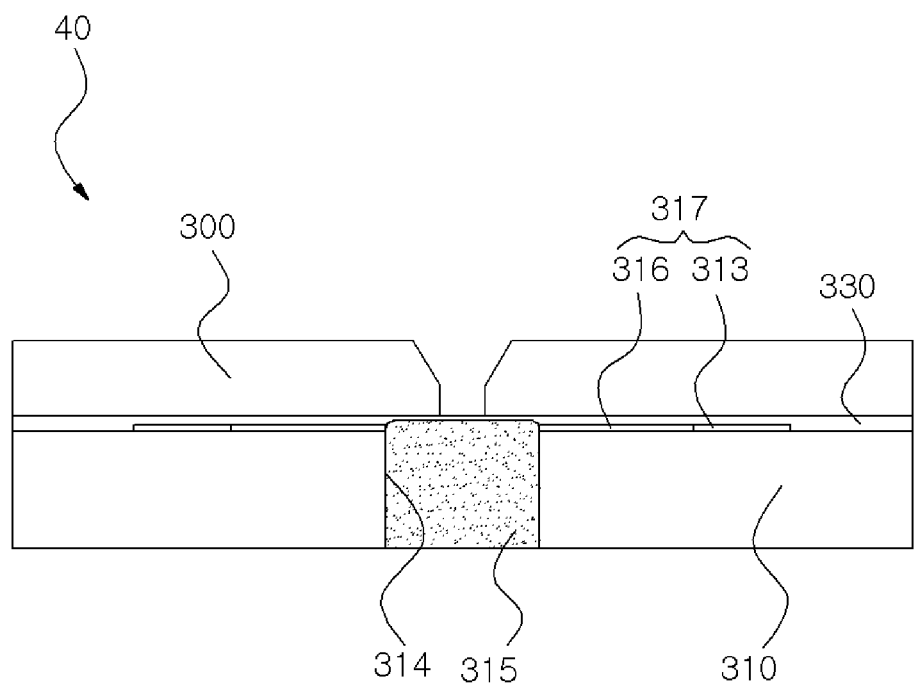
FIG. 15 is a cross-sectional view of a portion of a thrust panel according to another embodiment of the present invention.

FIG. 15 is a cross-sectional view of a portion of a thrust panel according to another embodiment of the present invention.

Referring to FIG. 15, a thrust panel 40, a solar panel module, or a spacecraft according to another embodiment of the present disclosure may include a propellant 315 that does not require an ignition element. The thrust panel 40 may include a printed circuit board 310, a nozzle layer 300, and an adhesive layer for nozzle layer 330. The description of the propellant 315, the nozzle layer 300, and the adhesive layer for nozzle layer 330 may be substituted with the description of the thrust panel 30 shown in FIG. 14.

The printed circuit board 310 may include a microchamber 314 and the ignition circuit 317 connecting the microchamber 314. The ignition circuit 317 may include an electrode 316 and a conductive wire 313. The ignition circuit 317 may be provided on a plane of the printed circuit board 310, and the electrodes 316 may be provided on both sides of the microchamber 314 and may be spaced apart by the diameter of the microchamber 314.

A propellant 315 for rocket propulsion is inserted into the microchamber 314 and the propellant 315 may be connected to the ignition circuit 317. The propellant 315 may be filled to the level of the electrodes 316 provided on both sides of the microchamber 314 and may be connected to the electrodes 316 of the ignition circuit 317 at the top of the microchamber 314. When a voltage is applied to the propellant 315 by flowing a current through the ignition circuit 317 combustion may occur entirely, starting from the upper end of the propellant.

In the above, the configuration and features of the present invention have been described based on the embodiments of the present invention, but the present invention is not limited thereto, and various changes or modifications can be made within the spirit and scope of the present invention. It is apparent to those skilled in the art, and therefore, such changes or modifications are intended to fall within the scope of the appended claims.

What is claimed is:

1. A solar panel module comprising:
   a solar panel;
   a printed circuit board being combined with a plane of the solar panel and including a microchamber and an ignition circuit;
   a propellant inserted into the microchamber and connected to the ignition circuit; and
   an ignition element applied on the ignition circuit and the propellant to connect the ignition circuit and the propellant,
   wherein the ignition circuit comprises electrodes spaced apart by a diameter of the microchamber and disposed at both ends of the microchamber, and
   the ignition element comprises a conductive material having a resistance that is higher than the resistance of the electrode, and is combined with the electrodes to connect each of electrodes of the ignition circuit.

2. The solar panel module according to claim 1 further comprising a reinforcing layer disposed between the solar panel and the printed circuit board.

3. The solar panel module according to claim 2 further comprising an adhesive layer for reinforcing layer disposed between the printed circuit board and the reinforcing layer to combine the printed circuit board with the reinforcing layer.

* * * * *